(No Model.) 3 Sheets—Sheet 1.
G. VAN DUZER.
SYSTEM OF VENTILATING, COOLING, HEATING, AND LIGHTING RAILWAY CARS AND COOLING THEIR AXLE BOXES.
No. 319,358. Patented June 2, 1885.
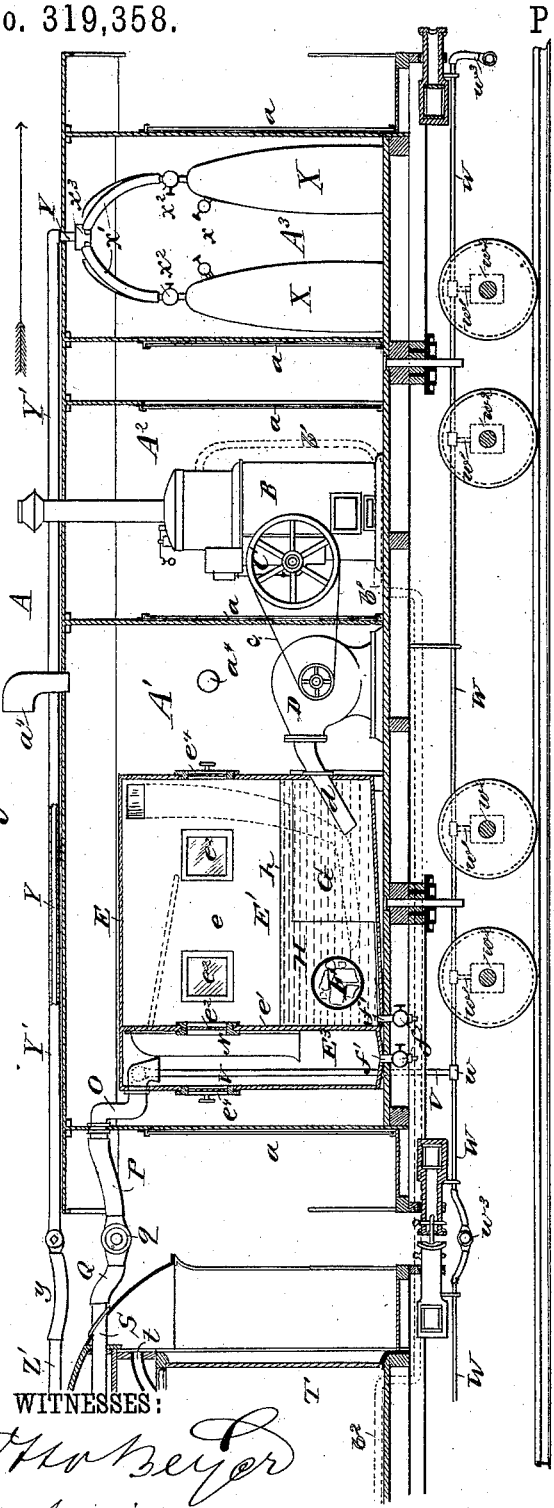
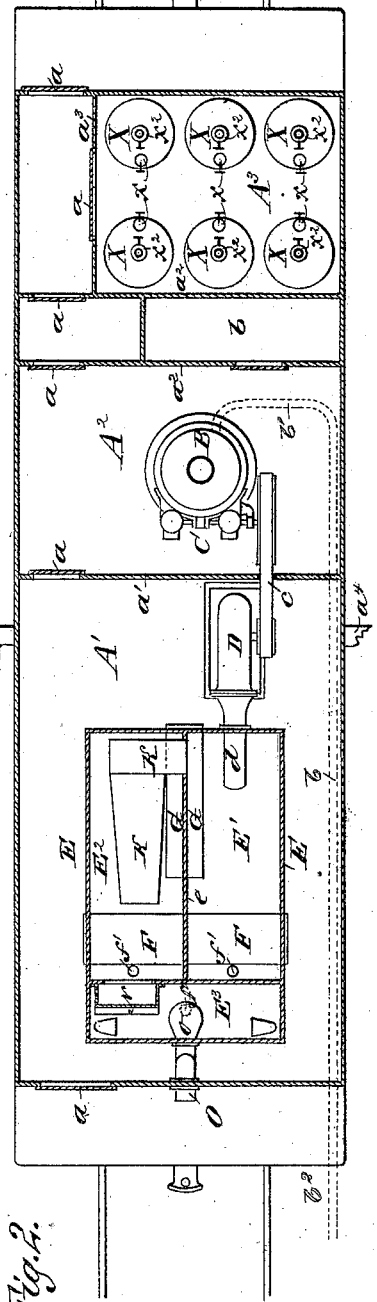
WITNESSES:
INVENTOR:
G. Van Duzer
BY Munn &Co.
ATTORNEYS.

(No Model.) 3 Sheets—Sheet 2.
G. VAN DUZER.
SYSTEM OF VENTILATING, COOLING, HEATING, AND LIGHTING RAILWAY CARS AND COOLING THEIR AXLE BOXES.
No. 319,358. Patented June 2, 1885.
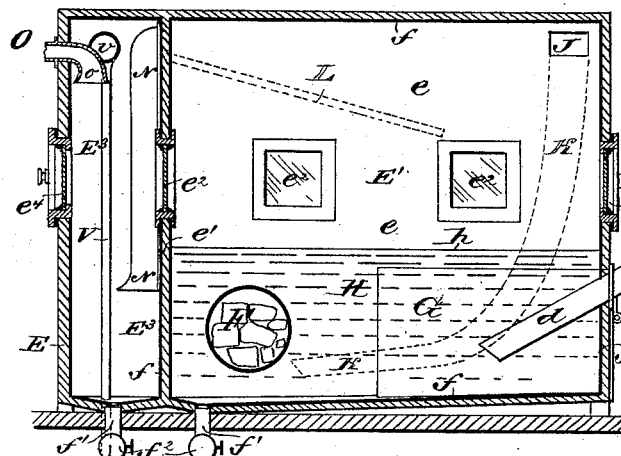
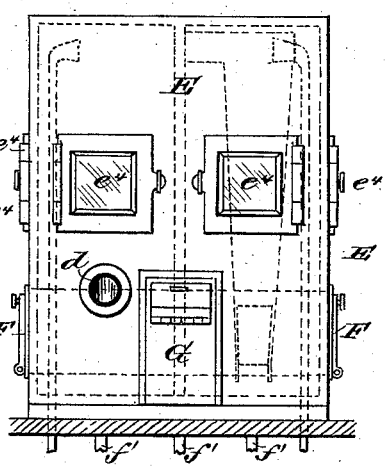
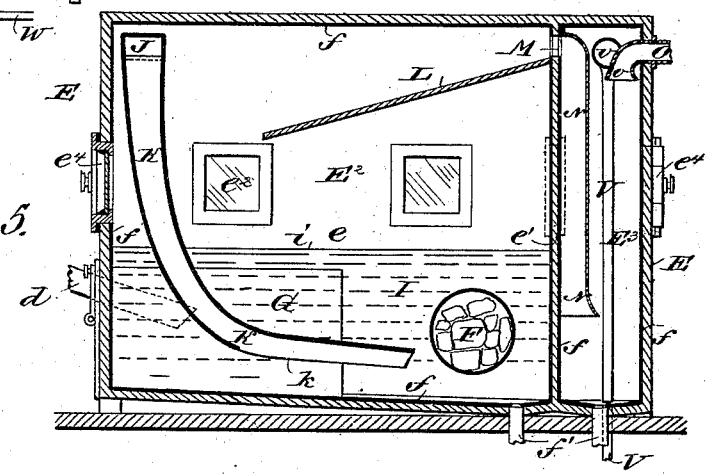
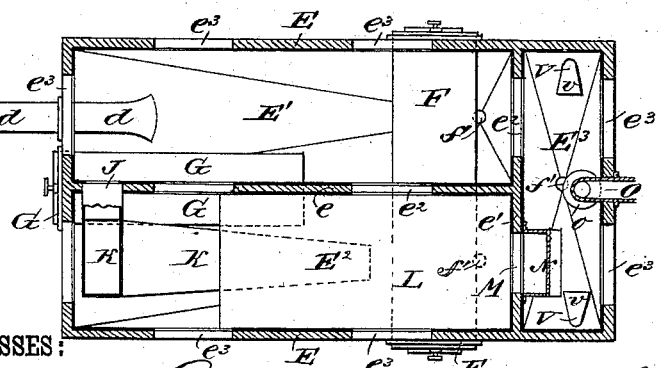
WITNESSES:
INVENTOR:
G. Van Duzer
BY Munn & Co
ATTORNEYS.

(No Model.) 3 Sheets—Sheet 3.
G. VAN DUZER.
SYSTEM OF VENTILATING, COOLING, HEATING, AND LIGHTING RAILWAY CARS AND COOLING THEIR AXLE BOXES.
No. 319,358. Patented June 2, 1885.
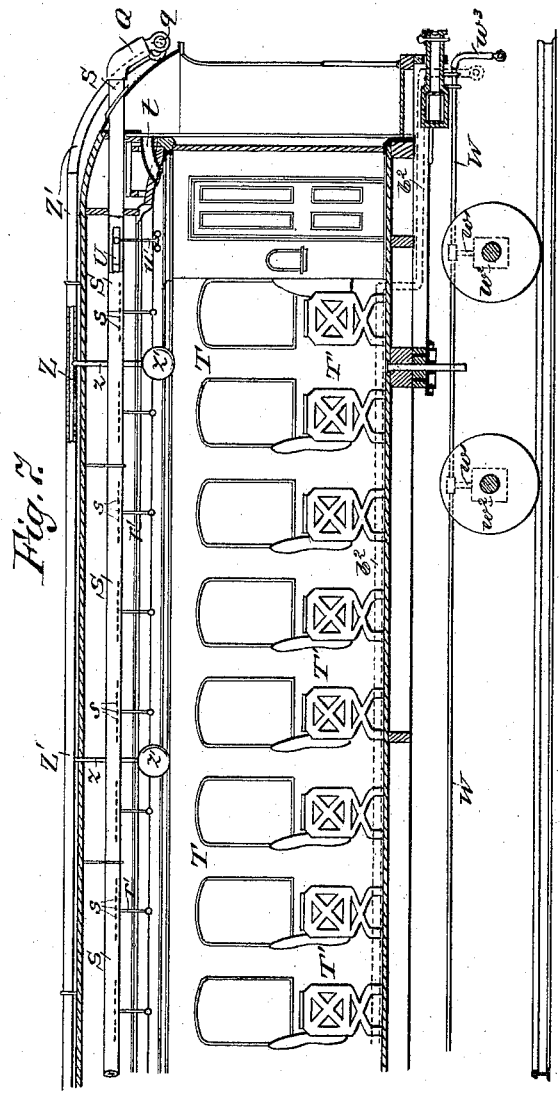
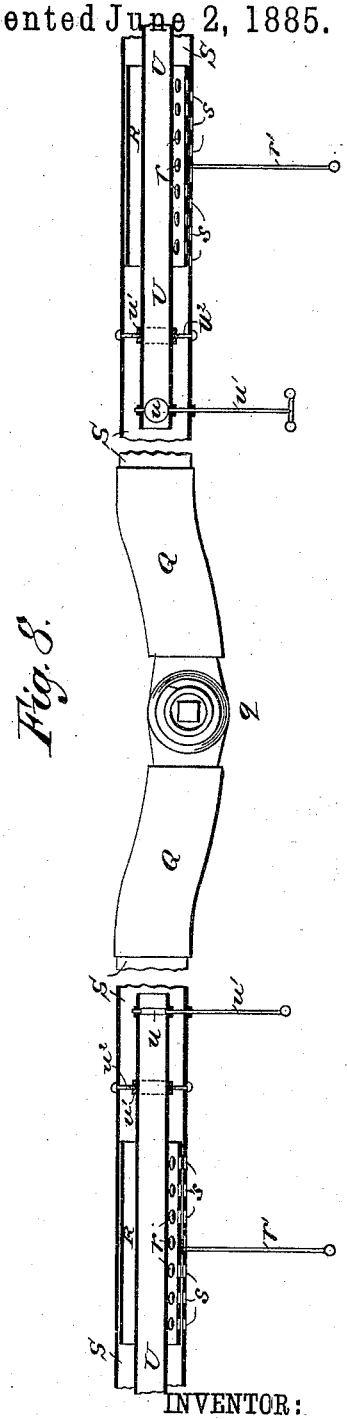
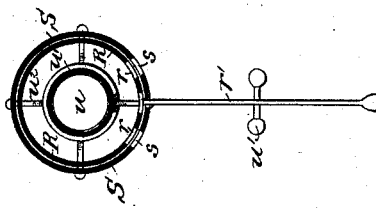
WITNESSES:
INVENTOR:
G. Van Duzer
BY Munn & Co.
ATTORNEYS.
N. PETERS, Photo-Lithographer, Washington, D. C.

UNITED STATES PATENT OFFICE.

GEORGE VAN DUZER, OF NEW YORK, N. Y.

SYSTEM OF VENTILATING, COOLING, HEATING, AND LIGHTING RAILWAY-CARS AND COOLING THEIR AXLE-BOXES.

SPECIFICATION forming part of Letters Patent No. 319,358, dated June 2, 1885.

Application filed February 25, 1885. (No model.)

*To all whom it may concern:*

Be it known that I, GEORGE VAN DUZER, of the city, county, and State of New York, have invented a new and Improved System of Ventilating, Cooling, Heating, and Lighting Railway-Cars and Cooling their Axle-Boxes, of which the following is a full, clear, and exact description.

My invention relates to a system of ventilating, cooling, heating, and lighting railway-cars and cooling their axle-boxes, and has for its object to secure the best and most economical results in carrying out the various operations involved and with the least inconvenience to the train-hands or passengers of a railway.

The invention consists, mainly, in providing a separate car, which is to be coupled in a railway-train, and carries an independent steam boiler and motor, a blower or air-blast apparatus driven by said motor, an air purifying and cooling apparatus operated by forcing air from the blower through a body or bodies of cold water, pipes connecting the air purifying and cooling apparatus with air-distributing pipes ranging through the interior of the cars and with pipes leading to the axle-boxes of the cars, and pipes carrying steam from the boiler in said independent car to heat the cars of a train, and said independent car having space for the storage of an illuminant, which may be gas or electricity, and pipes or conduits for the gas or the electric wires to burners or lamps in the several cars of the train.

The invention includes, also, certain special features of construction of the apparatus employed in carrying out the system, all as hereinafter fully described and claimed.

Reference is to be had to the accompanying drawings, forming part of this specification, in which similar letters of reference indicate corresponding parts in all the figures.

Figure 1 is a longitudinal vertical sectional elevation of the independent car and apparatus employed in my system and a portion of an adjacent passenger-car. Fig. 2 is a sectional plan view of the independent car and its apparatus. Fig. 3 is a longitudinal sectional elevation of the air purifying and cooling apparatus, taken through the chamber through which the air first passes. Fig. 4 is an end view at the air-inlet end of the air purifying and cooling apparatus. Fig. 5 is a longitudinal sectional elevation of the air purifying and cooling apparatus, taken through the second chamber thereof. Fig. 6 is a sectional plan view of the air purifying and cooling apparatus. Fig. 7 is a longitudinal sectional elevation of part of a passenger-car, illustrating the arrangement therewith of the ventilating and heating and illuminant pipes, and also the axle-box cooling-pipes and connections. Fig. 8 is a detail sectional elevation of parts of the air-distribution pipes of two cars and their flexible coupling, and Fig. 9 is a transverse section through an air-distribution pipe and one of its valves. Figs. 3, 4, 5, 6, 8, and 9 are drawn to a larger scale.

The letter A indicates an independent railway-car, which contains the apparatus utilized in my improved system of ventilating, cooling, heating, lighting, and cooling the axle-boxes of all the cars of a train with which the car A will be coupled directly behind the engine. This car A is by preference divided into separate divisions or compartments $A'$ $A^2$ $A^3$ by inner partitions, $a'$ $a^2$ $a^3$, as indicated in Fig. 2.

In the compartment $A'$, I arrange the air-purifying and cooling apparatus; in the compartment $A^2$, the boiler and engine for operating the air-purifying and cooling apparatus and for heating the cars, and in the compartment $A^3$ may be placed the tanks, generators, or reservoirs for the illuminant employed for lighting the cars. I propose to fit sliding doors $a$ into the ends of the car and in its inside partitions, for access to the car and its several compartments, and larger doors will be provided over openings at the sides of the car, through which openings may be passed the various apparatus employed in the car; and a compartment, $b$, may be provided to hold the coal or other fuel used for generating steam in the boiler B, placed in the compartment $A^2$. An engine, C, shown supported on the boiler B, takes steam therefrom, and a belt, $c$, leads from the engine drive-wheel to the driving-pulley of a fan-blower, D, in compartment $A'$, and the air entering through suitable hoods or caps, $a^4$, at the roof and sides of the compartment A' enters the inlet-orifice of the blower, and is discharged through a pipe, $d$, into the first chamber, E', of the air-purifier and cooler E. This structure E in its preferred form has three main chambers, E' $E^2 E^3$, the two former serving as the air purifying and cooling chambers, and the latter serving as a pure and cold air reservoir from which the air is taken by various pipe-connections for distribution to the cars and their axle-boxes, as hereinafter explained. The longitudinal and transverse partitions $e\ e'$, which divide the structure E into the chambers E' $E^2 E^3$, have the transparent glazed openings $e^2$, which are in line with the glazed openings $e^3$ in the side and end walls of the structure, so that light is freely admitted within it, and all parts of it may at any time be inspected; and I prefer to fit hinged glazed doors $e^4$ at the outer wall-openings, $e^3$, which doors may be opened at any time for access to the interior chambers for cleaning them or adjusting the apparatus inclosed in them.

As best seen in Figs. 3, 5, and 6, I prefer to line the interior walls of the chambers E' $E^2$ $E^3$ with galvanized sheet iron or zinc, or other non-corrosive water-proof substance $f$.

Across the structure E, and so as to pass through both its chambers E' $E^2$, I arrange an ice-holding chamber or vessel, F, and directly beneath one end of partition $e$, I arrange an ice-holding chamber, G, which ranges longitudinally of the structure E. Either one or both of these ice-chambers F G, when filled with ice, have direct cooling effect upon the water H I, which is filled into the chambers E' $E^2$, respectively, so as to submerge the ice-chambers, and up to about the levels indicated at $h\ i$, or up to one-half the height, more or less, of the water-chambers E' $E^2$. The ice-chambers have suitable doors at their ends to allow the ice to be filled into them.

Near the upper part of the partition $e$, and at one corner of the chamber E', there is an opening, J, with which connects the upper end of an air pipe or conduit, K, which ranges downward in the chamber $E^2$ and enters the water I in said chamber, and preferably extends horizontally for some little distance along the chamber, near its bottom, said pipe K being open at the bottom of its horizontal portion, as at $k$, Fig. 5.

Above the water I is fixed along the chamber $E^2$, near its upper part, the moisture-deflecting plate L, which extends from the end wall, $e'$, of said chamber, and preferably at a downward incline for about two-thirds of the length of the chamber. (See Figs. 5 and 6.)

Over the plate L an opening, M, is formed in wall $e'$, with which opening communicates a hood or case, N, forming a conduit which preferably is carried down the chamber $E^3$, so its open lower end reaches low down in said chamber to discharge the air therein next its floor, so that any moisture that may have been carried over through opening M with the air will fall directly to the bottom of the chamber $E^3$ and at a place distant from the upper air-outlets therefrom, so that the air will leave the chamber in a dry condition. It will be seen that the air discharged from the blower D will pass from pipe $d$ into the body of cold water H, which will cool the air and hold back all dust or impurities, and the air will rise from or through the water and pass through opening J and pipe K into the body of cold water I, and will thereby be made considerably cooler, and as the air rises from the water I most of it will strike the plate L, which will prevent the passage of any considerable moisture through the passages M N with the air into the air reservoir or chamber $E^3$, and the air entering said chamber will be thoroughly purified and cooled, and will be in fit condition for distribution to the cars for ventilating and cooling them, or to the car-axle boxes for cooling them, as presently explained. Drain-pipes $f'$ having any suitable valves, $f^2$, are fitted in the sloping floors of the chambers E' $E^2 E^3$, which allow the water H I to be drawn from the chambers E' $E^2$ when fresh water is required, and allows any drip-water or moisture to be drained from the air-chamber $E^3$.

I do not limit myself to the use of two communicating chambers holding water, through which the air is forced by the blower D, as any desired number of the chambers may be employed. A suitable pipe, O, preferably having the pendent belt-mouthed end $o$, is fixed in the chamber $E^3$, near its top, and projects from the end of the car A to receive the flexible coupling-pipe P, with which may be connected the like flexible coupling-pipe Q on either end of an air-distribution pipe, S, one of which pipes ranges lengthwise from end to end of each of the passenger-cars T of the train.

The air-distribution pipe S may range along the floor of the car T; but I show it hung from and near the car-roof and at the center of the car, so it may discharge the air downward from series of apertures, $s$, made at intervals in its lower half or portion, and over each series of apertures $s$, I fit within the pipe S an apertured damper or slide-valve, R, the holes $r$ of which may be brought to coincide with the holes $s$ of pipe S, to allow the air to escape from any one or more of the series of holes at the will of the passengers occupying the seats T', below the pipe, by shifting the valves R one way by means of their pendent stems or handles $r'$; and by shifting the valves the other way the outlets $s$ may be closed to cut off the discharge of air from over any one or more of the seats of the car.

The air-circulation pipes S of the several cars of a train will be connected by their flexible couplings Q, the end joints, $q$, of which will preferably be fitted with valves, which will be opened as the couplings are connected, and which will close automatically as the couplings are disconnected, so that the back end of the pipe S of the last car always will be closed to prevent the air blowing through, and so that proper pressure will be maintained in the pipes S of all the cars of the train to insure the forcible exit of air from any one of the series of outlets $s$ of the pipes.

Common flexible hose-couplings may be used at Q to connect the pipes S of the several cars, and removable caps may be fitted to the ends of the pipes S, so that however the cars are coupled in making up a train a cap will close the back end of the pipe S of the last car; but the automatically opening and closing couplings are preferred.

To effect the more even distribution of the air from the pipes S of the several cars of a train, however the cars may be coupled together, I support within the pipe S of each car a smaller imperforate pipe, U, of about one-third the diameter(more or less)of pipe S, and at or near the opposite open ends of the pipe U, which extends for quite the whole length of pipe S, I place valves or dampers $u$, which are provided with stems $u'$, by which the dampers $u$ may be operated to open or close the pipes U as may be necessary.

When the train is made up, the damper $u$ of pipes U of the forward cars will be opened for free passage of the air through them from the blower D, and the air purifying and cooling apparatus E, hereinbefore explained, and the dampers $u$ of the air-pipes U of the rear cars of the train, will be closed more or less, so that the weaker currents of air in pipes S of the rear cars will not be diverted into their pipes U; hence the air will pass more freely and under greater pressure from the series of apertures $s$ of the pipes S of the rear cars to ventilate and cool said cars quite as thoroughly as are the forward cars, through the pipe S of which latter cars the air naturally passes with greater force, as will readily be understood.

I will provide openings $t$ at both ends of the cars T, near their tops, and said openings will have any suitable hinged doors or valves, by which they may be opened for outlet of foul air from the cars, the rear openings, $t$, only being opened, so as to prevent entrance of dust at the front ends of the cars, and to cause the force of the fresh air entering the cars from pipes S to carry the foul air through the rear openings, $t$.

I show the pipes U supported in the pipes S by collars $u^2$ and spacing-bolts $u^3$, which form "spiders" to hold the pipes U centrally in pipes S; but the pipes U may otherwise be fastened directly at the upper sides or parts of the pipes S, if preferred.

I utilize the pure cold air in the chamber $E^3$ for cooling the axle-boxes of all the cars of the train; and to conduct said air to the axle-boxes I employ the stand-pipes V V, which preferably have bent bell-mouthed ends $v\ v$, and are set in chamber $E^3$, one at each side or end of it, and extend through the floors of the chamber and of the car A, where they connect by suitable couplings, $w$, with a pipe, W, which has branch pipes, $w'$, leading to the interior of the axle-boxes $w^2$, so that the cold air will be forced into the boxes around the axle-bearings to keep them cool.

The car A and all the passenger-cars T will be provided alike with the pipes W, having branch pipes $w'$ leading to their axle-boxes $w^2$, and the pipes W of the several cars will have suitable flexible couplings, as at $w^3$, which will be connected when the train is made up, so that the axle-boxes of all the cars of the train will be supplied with cold air from the air-chamber $E^3$ and pipes V V. As the independent boiler and engine B C and blower D supply the cold air constantly when the cars are on the road, it is evident that the axle-boxes are supplied with cold air when the cars are stopped at stations; hence any warm boxes are quickly cooled off and prevented from overheating afterward. A coupling, $w^3$, at the front of car A may connect its pipe W with pipes on the engine, which lead into its axle-boxes for cooling them also.

For heating the cars, when required, I will take steam through pipe $b$ from boiler B and circulate it through the cars to suitable steam-heating pipes $b^2$ therein, so that all the cars of the train may be heated without taking steam from the locomotive-engine for the purpose; or, in case the cars be run by electricity when no steam is otherwise available, and, if required, I will put in a large separate boiler in compartment $A^2$, to supply the steam for heating purposes. The pipes $b'\ b^2$ are indicated in dotted lines in Figs. 1, 2, and 7.

For lighting the cars of a train I may provide in the compartment $A^3$ of car A any suitable electrical storage-batteries or dynamos run by engine B C for the generation of electricity, which fluid may be conducted by wires to lamps placed in the several cars of the train, suitable couplings being provided to connect the wires of the several cars quickly in making up trains. The drawings show in said compartment $A^3$ of car A a series of gas-storage tanks, X, each of which has a valved charging-inlet, $x$, for filling them under high pressure, and has also an outlet-pipe, $x'$, valved at $x^2$, and communicating with a box or chamber, $x^3$, with which is connected the main gas-pipe Y, which ranges along the top of car A, and is connected by a suitable flexible coupling, $y$, with the gas-supply pipe Z of the adjacent passenger-car T, and all the passenger-cars of the train will have gas-pipes Z, with suitable connected couplings for supplying illuminating-gas through branch pipes $z$ to the burners $z'$ of every car of the train from one or more of the tanks X in the independent car A, as will readily be understood. I show the pipes Y Z inclosed, respectively, in outer coverings of felt or other suitable non-conductors, $Y'\ Z'$, and the cold-air pipes W $w'$, leading to the car-axle boxes, may be covered in like manner, if desired.

When electricity is used for lighting the cars, the wire conductors may be passed either through the pipes S or Y Z, or directly through the interior of the cars, as may be preferred.

It is evident that any desired number of blowers, D, or other approved air-forcing machines may be employed in car A, and also that the cold air may be forced from the air purifying and cooling apparatus E directly into the interior of cars carrying meats, fruits, vegetables, and other perishable freight to refrigerate the cars for preserving their contents, and the axle-boxes of the heavily-loaded freight-cars may also be cooled by the cold air from the apparatus E, substantially as above described.

I am aware that an air-fan has heretofore been arranged below the floor of a railway-car for driving air past refrigerating-wheels which revolve in shallow water, so as to purify the air and cool it, the air then being driven through an ice-chamber, and thence through conduits into the car through its floor, the said air-fan being driven by gearing operated by the rotation of an axle of the car; but the duplication for every car of the air purifying and cooling apparatus and means for operating it make this system expensive and quite impracticable.

I also am aware that it is not new to use an air-fan driven by gearing connected with an axle of a railway-car truck to force cooled air into the axle-boxes of the truck to prevent overheating of the axles and boxes; but the duplication of the air-fan devices and their driving mechanism for each truck makes this system expensive and quite impracticable.

Having thus fully described my invention, I claim as new and desire to secure by Letters Patent—

1. The herein-described system of ventilating, cooling, heating, and lighting trains of railway-cars and cooling their axle-boxes, which consists in combining in an independent car coupled in the train, a boiler and engine, a blower or air-forcing apparatus driven by said engine, an air purifying and cooling apparatus, provision of storage of or for generating an illuminant, and means for conducting the air, steam, and illuminant through the other cars of the train, and leading the air to the car-axle boxes by suitable coupled pipes, substantially as herein set forth.

2. In a system of ventilating and cooling trains of railway-cars, the combination, with an independent motive power carried thereby, of an air-forcing apparatus driven by said motor, and an air purifying and cooling apparatus, and conduits therefrom to air-distributing pipes ranging along the cars and discharging the air therein and provided with flexible couplings at their ends, substantially as herein set forth.

3. In a system of ventilating and cooling trains of railway-cars, the combination, with an independent car coupled in the train, of an independent motive power carried thereby, an air-forcing apparatus driven by said motor, and an air purifying and cooling apparatus operating by the forcing of the air through a body or bodies of cold water, and conduits therefrom to pipes ranging along the cars and discharging the air therein, and provided with flexible couplings at their ends, substantially as herein set forth.

4. In a system of cooling the axle-boxes of railway-cars, the combination, with an independent car coupled in a railway-train, of an independent motive power carried thereby, an air-forcing apparatus driven by said motor, and an air purifying and cooling apparatus, and conduits therefrom to coupled air-distributing pipes ranging along the cars and opening into the axle-boxes of the cars, substantially as herein set forth.

5. In a system of ventilating and cooling railway-cars, the air purifying and cooling apparatus E, constructed with chambers $E'$ $E^2$ $E^3$, said chambers $E'$ $E^2$ having bodies of water H I filled into them, respectively, and provided with ice-chambers F G, one or both, air conduits and passages $d$ J K M, arranged in the chambers $E'$ $E^2$ and conveying the air to the chamber $E^3$, and the pipes O V, leading the air from chamber $E^3$, substantially as herein set forth.

6. The combination, in the herein-described air purifying and cooling apparatus, with the passage M, connecting its chambers $E^2$ $E^3$, and with the air-outlets O V, opening at or near the top of chamber $E^3$, of the air-passage N, opening low down in chamber $E^3$, substantially as herein set forth.

7. In a system of ventilating and cooling railway-cars, the combination, with the cars, air-distributing pipes S, having series of apertures $s$, and valves R, controlling said apertures and provided with flexible end couplings, of the imperforate open-ended pipes U, placed in pipes S, and provided with dampers or valves $u$, substantially as herein set forth.

GEORGE VAN DUZER.

Witnesses:
HENRY L. GOODWIN,
EDGAR TATE.